United States Patent Office 3,449,324
Patented June 10, 1969

3,449,324
PROCESS FOR THE PRODUCTION OF
5H-DIBENZ[b,f]AZEPINES
Henri Schramek, Basel, and Jean Riethmann and Jorg Kallen, Allschwil, Basel-Land, Switzerland, assignors to Geigy Chemical Corporation, Ardsley, N.Y., a corporation of New York
No Drawing. Continuation-in-part of application Ser. No. 402,936, Oct. 9, 1964. This application Oct. 10, 1967, Ser. No. 677,496
Claims priority, application Switzerland, Sept. 23, 1964, 12,372/64
Int. Cl. C07d 41/08
U.S. Cl. 260—239                                6 Claims

ABSTRACT OF THE DISCLOSURE

Iminostilbenes are prepared in high yield and with minimum side-product formation through the reaction of iminodibenzyls and a ferric oxide dehydrogenation reagent.

CROSS-REFERENCE

This is a continuation-in-part of copending application Ser. No. 402,936 filed Oct. 9, 1964, and now abandoned.

DETAILED DESCRIPTION

This invention concerns a novel and improved process for the production of 5H-dibenz[b,f]azepines, alternatively named as iminostilbenes.

Whereas the corresponding 10,11-dihydro-5H-dibenz [b,f]azepines, the so-called iminodibenzyls, are relatively easily accessible from o,o'-diaminodibenzyls by deaminating ring closure, the production of the corresponding 5H-dibenz[b,f]azepines is considerably more involved.

Iminostilbenes have been produced from the corresponding iminodibenzyls via a four step process involving acylation, bromination, dehydrobromination and deacylation. This method has the disadvantages of a low degree of conversion and the necessity of relatively expensive reagents.

Catalytic dehydrogenation as with palladium particularly in the presence of hydrogen acceptors such as maleic acid esters give fairly satisfactory yields but suffers from the cost of the catalyst itself and the problems involved in removing the reaction products of hydrogen acceptors.

Other substances such as vanadium oxide and molybdenum oxide on aluminum oxide support, result in excess formation, often up to 90%, of undersired products such as acridine and methylacridine.

Numerous other agents which are conventionally used for dehydrogenation or oxidation, such as sulfur, selenium, chloranil, nitrobenzene, lead tetraacetate and the like, have been found to be unsatisfactory or inoperative for the present purpose.

It has now been discovered that the dehydrogenation of iminodibenzyl to iminostilbene can be successfully and inexpensively accomplished in a single step, with minimal production of acridines, through the use of ferric oxide ($Fe_2O_3$). While ferric oxide alone may be used, superior results are obtained with a dehydrogenation reagent obtained by treating a mixture of from about 35 to about 70%, preferably 45 to 65%, of ferric oxide ($F_2O_3$), 1.5 to 3.0% chromium trioxide ($Cr_2O_3$), 10 to 15% calcium oxide (CaO) and the balance of potassium carbonate ($K_2CO_3$), all percentages being by weight of the total weight of the dehydrogenation reagent. This mixture is advantageously combined with a combustible binding material such as charcoal, heated to remove the binding agent and to sinter the residue into a porous mass, treated with hydrogen at from about 400° to about 450° C. until substantially all of the iron is reduced to ferriferrous oxide ($Fe_3O_4$), and then reoxidized with air or oxygen at from about 550° to about 650° C. until substantially all of the iron is in the form of ferric oxide ($Fe_2O_3$).

The iminodibenzyl, in vaporous form, is then brought into contact with the foregoing reagent at a temperature of from about 300 to about 500° C., preferably 300 to 450° C. and ideally from about 400 to about 425° C. The iminodibenzyl is generally admixed with an inert gaseous diluent, including both true gases such as nitrogen, ammonium, argon or the like, and vaporous diluents, most notably steam. Steam has been found to be a particularly advantageous diluent. Contact time between the two reactants generally ranges from 1 to 5 seconds, preferably 1 to 3 seconds, depending upon the ratio of diluent to iminodibenzyl, which can vary from about 10:1 to about 100:1.

The two reagents may be brought into contact either (a) by passing the iminodibenzyl and diluent over a stationary bed or through a suspended bed of the dehydrogenation reagent by suspending the dehydrogenation reagent in a stream of the other reactant, or (b) by passing the two reactants counter-currently. Continuous production can be realized in the former embodiment by employing two or more contact beds, utilizing one for reaction while the spent dehydrogenation reagent in a second is replenished. In the second embodiment, the spent dehydrogenation reagent from the reaction zone is regenerated, as described hereafter, in a second zone and recycled.

The iminostilbene formed is separated as a vapor and can be isolated and collected through condensation, for example, by spraying with water. Further purification by conventional methods such as recrystallization may follow as necessary.

The present process is also suitable for the preparation of aromatic substituted iminostilbenes providing the substituents are relatively inert, e.g., methyl iminostilbenes. Conversion rates are however generally lower with such transformations.

The foregoing dehydrogenation reagent, in terms of initial composition, is similar to known compositions, generally identified as butene-butadiene iron oxide catalysts. Such compositions however when used for the conversion of butene to butadiene or the conversion of ethylbenzene to styrene involve a truely catalytic process, in contrast to the present process which utilizes stoichiometric amounts of ferric oxide. Thus in the case of the prior art iron oxide catalytic processes which generally are autoregenerative and effective for hundreds of hours, either a separate prereduction step or an initial induction period is required to insure conversion of ferric oxide to ferriferrous oxide. The active catalytic entity is thus ferriferrous oxide. This is catalytically effective only at about 500° C. and more commonly from about 600° to 1200° C. Such a true catalytic process, as has been heretofore practiced, is essentially continuous for long periods of time. Regeneration of the catalyst, when eventually needed, involves only a purging of the catalyst of side products, not a chemical transformation of the catalyst itself.

While ferriferrous oxide will effect some catalytic dehydrogenation of iminodibenzyl to iminostilbene, it does so only with a rate of conversion of about 20%. Moreover at the high temperatures required for maximum catalytic efficiency, excessve formation of acridines occurs.

The present process utilizes a dehydrogenation reagent which, when used according to this invention, contains ferric oxide ($Fe_2O_3$) and not ferriferrous oxide ($Fe_3O_4$). Thus not only is prereduction or initial induction period unnecessary, it is to be avoided. In the course of the desired dehydrogenation of iminodibenzyl to iminostilbene, the ferric oxide, which is present in as much as a five molar excess of iminodibenzyl, is converted to ferriferrous oxide in stoichiometric amounts with the generation of water. The presence of oxygen as a separate potential reactant has no effect. This chemical transformation takes place at temperatures well below those generally employed for catalytic dehydrogenation and results in major rates of conversion of from 50 to as high as 90%.

During the course of this reaction, the depletion of ferric oxide decreases the chemical conversion of iminodibenzyl to iminostilbene while the increasing amounts of the ferriferrous oxide formed result in initiation of the catalytic dehydrogenation. The latter, catalytic, conversion however proceeds at a lower rate of conversion than does the former, chemical, conversion as described above. For example, while the molar rate of conversion during the 10 to 20 minutes will be as high as 90%, this will drop to as low as 20% as ferriferrous oxide is formed and ferric oxide is depleted. Simple mechanical losses in subsequent isolation make it uneconomical to continue dehydrogenation at the latter stage. Consequently it is desirable to interrupt the reaction when a subtsantial amount of ferric oxide has been converted to ferriferrous oxide. This generally involves from about 30 to 60 minutes, depending upon concentration of iminodibenzyl and the particle size of the dehydrogenation reagent which determines the surface material actually available and can be determined by observing when the rate of conversion fails to hold constant but begins to decrease substantially.

The spent dehydrogenation reagent is then reoxidized with oxygen or air at from about 550° to about 650° C. As previously discussed, the principal reaction and reoxidation may be performed intermittently in two or more reactors or continuously with the spent dehydrogenation reagent being introduced into an oxidizer and then recycled.

The following examples illustrate the invention. Parts and percentages are given by weight; the relationship of parts by weight to parts by volume is as that of grams (g.) to milliliters (ml.). The temperature is given in degrees centigrade.

Example 1

A stream consisting of 23.1 parts of vaporous 10,11-dihydro - 5H-dibenz[b,f]azepine and 117 parts of steam, (molar ratio about 1:55) is passed in 1 hour at 410° through 200 parts by volume of a stationary bed of a dehydrogenation reagent, in pellet form, which reagent consists of 54% of $Fe_2O_3$; 3% of $Cr_2O_3$; 10% of CaO; and the balance of $K_2CO_3$.

The above conditions correspond to a contact time of about 2 seconds.

At the outlet of the stationary contact bed, the emerging gaseous mixture is condensed by direct injection of cold water (15–25°); the resulting crystallized reaction product is separated from the water by filtration and then dried. This dry reaction product consists of 14.1 parts of 5H-dibenz[b,f]azepine and 8.0 parts of starting material in addition to 0.1 part of 5-methyl-acridine and 0.4 part of acridine.

The pure 5H-dibenz[b,f]azepine is isolated, dissolving the filtration cake in 56 parts of hot chlorobenzene, and crystallizing by cooling. At 20°, 12.8 parts of 5H-dibenz[b,f]azepine crystallize out and can be isolated by filtration from the mother liquor. This product has a purity of over 99%. To remove acridine and methylacridine, the mother liquor is extracted at pH 3 with aqueous hydrochloric acid. On distilling off the chlorobenzene, a mixture of 1.2 parts of 5H-dibenz[b,f]azepine and 8.0 parts of 10,11 - dihydro-5H-dibenz[b,f]azepine are regained, which mixture can be directly recycled into another run of the process. The yield rate of thus isolated pure 5H-dibenz[b,f]azepine is 92% of the converted starting material, at a conversion rate obtained by one run, from starting material to crude product, of about 62%; and from starting material to pure product of 55.4%.

Example 2

A stream consisting of 15 kilograms (kg.) of vaporous 10,11 - dihydro - 5H-dibenz[b,f]azepine and 62.5 kg. of steam is passed in 30 minutes at a temperature of 410 to 400° through 300 liters of a stationary bed of freshly prepared dehydrogenation reagent having the same composition as described in Example 1 and being in pellets of $\frac{1}{16}''$ diameter. The crude reaction product, recovered by direct cooling and filtration as described in Example 1, consists in the first run of about 80% of 5H-dibenz[b,f]azepine and 12 to 20% of the starting material as well as about 8 to 5% of acridinic byproducts.

After 30 minutes of dehydrogenation under the above conditions, the stream of the above materials is interrupted and the dehydrogenation reagent is flushed with steam (at a rate of 125 kg. per hour) for 5 minutes, regenerated for 30 minutes with air at a temperature of 600°, cooled to 410°, and conditioned by the passage of steam for 5 minutes at a rate of 125 kg. per hour. A new cycle is then started by feeding a new vapourous mixture of 10,11 - dihydro - 5H - dibenz[b,f]azepine and steam through the regenerated bed.

Under these conditions as much as 200 to 300 cycles can be carried out with the same charge of dehydrogenation reagent with a decrease of the 5H-dibenz-[b,f]azepine yield rate from 80 to about 75%.

The purification of the recovered iminodibenzyl is carried out in this and in the following examples as described in Example 1.

Example 3

A gaseous stream of 18 parts of vaporous 10,11-dihydro-5H-dibenz[b,f]azepine and 88 parts of steam is directed in 2 hours at 420° over 70 parts by volume of chemically pure iron oxide which has been previously calcinated at 900°. The collected reaction product (17.4 parts) consists of 9.2 parts of starting material, 6.8 parts of 5H-dibenz[b,f]azepine, 1.2 parts of acridine and 0.2 part of 5-methyl acridine. The conversion rate of crude 5H-dibenz[b,f]azepine is thus 38% of the theoretical one calculated on the total amount of starting 10,11-dihydro - 5H - dibenz[b,f]azepine. The yield rate of the crude iminostilbene, calculated on the amount of consumed iminodibenzyl, is 77.4%.

Example 4

A mixture of 24.1 parts of vaporous 10,11-dihydro-5H-dibenz[b,f]azepine and 116.2 parts of steam is directed in 1 hour at 470° over 200 parts by volume of a dehydrogenation reagent which consists of 55% of $Fe_2O_3$, 17% of $K_2O$, 11% of CaO, and water. The reaction product contains 17.6 parts of 5H-dibenz[b,f]azepine (73° conversion rate), 1.8 parts of starting material, 0.9 part of 5-methyl acridine and 2.3 parts of acridine (14.5% of acridinic products). The yield of 5H-dibenz[b,f]azepine is 80% of theoretical, calculated on the amount of starting material.

Example 5

A mixture of 25.9 parts of 10,11-dihydro-5H-dibenz[b,f]azepine and 156,000 parts by volume of nitrogen (1 atm., 20°) are directed in 1 hour at 410° over 200 parts by volume of the dehydrogenation reagent described in Example 1. The further treatment is the same as in Example 1. 15.7 parts of 5H-dibenz[b,f]azepine (conversion rate 60.7%), 7.0 parts of starting material, 1.2 parts of acridine and 0.2 part of methyl acridine (5.6% of acridinic by-products calculated on total weight of reaction products) are obtained as solid reaction products.

Example 6

A mixture of 24.1 parts of vaporous 10,11-dihydro-5H-dibenz[b,f]azepine and 156,000 parts by volume of ammonia (1 atm., 20°) are directed in 1 hour at 410° over 200 parts by volume of the dehydrogenation reagent described in Example 1, further treatment being the same composition of the resulting end products (in percent by weight) are given in the following table:

| Run | Temp., °C. | Contact time (seconds) | Imino-stilbene | Unconverted imino-dibenzyl | Acridine | 5-methyl-acridine | Total of acridine products |
|---|---|---|---|---|---|---|---|
| a | 600 | 1.27 | 25 | 5 | 60 | 10 | 70 |
| b | 550 | 1.34 | 45 | 10 | 35 | 8 | 43 |
| c | 503 | 0.5 | 58 | 25 | 13 | 4 | 17 |
| d | 503 | 2 | 61 | 10 | 23 | 6 | 29 |
| e | 458 | 1.9 | 63 | 22 | 11 | 4 | 15 |
| f | 454 | 4 | 69 | 10 | 13 | 8 | 21 |
| g | 406 | 7.9 | 58 | 30 | 5 | 7 | 12 |
| h | 404 | 2 | 49 | 47 | 2 | 2 | 4 |
| i | 358 | 1 | 29.5 | 69 | 1 | 0.5 | 1.5 |
| j | 353 | 8 | 36 | 59 | 3 | 2 | 5 | as in the previous example. 15.2 parts of 5H-dibenz[b,f]azepine (conversion rate 63%), 7.1 parts of starting material, 0.9 part of acridine and 0.3 part of methyl acridine (about 5.1% of acridinic by-products) are obtained as solid reaction products.

Example 7

A stream consisting of 23.1 parts of vaporous 10,11-dihydro-5H-dibenz[b,f]azepine and 117 parts of steam is passed in 1 hour at 410°–415° through 200 parts by volume of a stationary bed of dehydrogenation reagent consisting of 62.3% of $Fe_2O_3$, 2.35% of $Cr_2O_3$, 7% of CaO and the balance of $K_2CO_3$, this dehydrogenation reagent being in pellet form of about 1/16" diameter. The reaction product collected as described in Example 1 consists of 15.2 parts of 5H-dibenz[b,f]azepine (conversion rate 65%), and 4.7 parts of starting material in addition to 2.7 parts of acridines.

Example 8

A stream consisting of 23.1 parts of vaporous 10,11-dihydro-5H-dibenz[b,f]azepine and 117 parts of steam, is passed in 1 hour at 410–415° through 200 parts by volume of a stationary bed of a dehydrogenation reagent having the same composition as that used in Example 7, but having been preactivated by admixture of charcoal, in excess amount, reduction in a stream of hydrogen at 415° followed by reoxidation with air at 600°.

The reaction product, collected as described in Example 1, consists of 18.5 parts of 5H-dibenz[b,f]azepine (conversion rate 80%), and 1.35 parts of starting material as well as 2.7 parts of acridinic by-products.

Example 9

Example 1 was repeated but in lieu of the dehydrogenation reagent used therein, a stationary bed of a reagent of the following composition was used (in parts by weight):

| | |
|---|---|
| $Fe_2O_3$ | 50.5 |
| $Cr_2O_3$ (present as $K_2Cr_2O_7$) | 1.8 |
| $Ca^{2+}$ (present as CaO) | 8.5 |
| $K^+$ (present as $K_2Cr_2O_7$ and $K_2CO_3$) | 14.9 |
| $CO_3^{2-}$ | 17.4 |
| $O^{2-}$ and impurities | Balance |

The temperature and contact time applied as well as the

What is claimed is:

1. A process for the production of 5H-dibenz[b,f]-azepine which comprises reacting vaporous 10,11-dihydro-5H-dibenz[b,f]azepine with at least a stoichiometric amount of a dehydrogenation reagent consisting of from about 35 to about 70% by weight of ferric oxide, from about 1.5 to about 3.0% by weight of chromium trioxide, from about 10 to about 15% by weight of calcium oxide and the balance of potassium carbonate, at a temperature of from about 400 to about 450° C. until the conversion of ferric oxide to ferriferrous oxide substantially reduces the rate of conversion of 10,11-dihydro-5H-dibenz[b,f]azepine to 5H-dibenz[b,f]azepine, and recovering the 5H-dibenz[b,f]azepine thereby produced.

2. The process according to claim 1 wherein the dehydrogenation reagent consists of from about 50 to about 65% by weight of ferric oxide, from about 1.5 to about 3% by weight of chromium trioxide, from about 10 to about 12% by weight of calcium oxide and the balance of potassium carbonate.

3. The process according to claim 1 including the step of intermittently reoxidizing the dehydrogenation reagent with oxygen or air at a temperature of from about 550 to about 650° C.

4. The process according to claim 1 wherein the vaporous 10,11-dihydro-5H-dibenz[b,f]azepine is in admixture with an inert vaporous diluent.

5. The improvement as described in claim 4, wherein the diluent is steam, nitrogen or ammonia, and is present in a molar ratio of from about 10:1 to about 100:1 relative to the 10,11-dihydro-5H-dibenz[b,f]azepine.

6. A process for the production of 5H-dibenz[b,f]azepine which comprises reacting vaporous 10,11-dihydro-5H-dibenz[b,f]azepine in admixture with from a tenfold to one hundredfold molar excess of steam with at least a stoichiometric amount of a dehydrogenation reagent consisting of from about 50 to about 65% by weight of ferric oxide, from about 1.5 to about 3% by weight of chromium trioxide, from about 10 to about 12% of calcium oxide and the balance of potassium carbonate at a temperature of from about 400° to about 425° C., until the conversion of ferric oxide to ferriferrous oxide substantially reduces the rate of conversion of 10,11-dihydro-5H-dibenz[b,f]azepine to 5H-dibenz[b,f]azepine and recovering the 5H-dibenz[b,f]azepine thereby produced.

References Cited

UNITED STATES PATENTS 3,074,931  1/1963  Craig _____ 260—239

ALTON D. ROLLINS, *Primary Examiner.*